US010796147B1

(12) United States Patent
Hanna

(10) Patent No.: US 10,796,147 B1
(45) Date of Patent: Oct. 6, 2020

(54) METHOD AND APPARATUS FOR IMPROVING THE MATCH PERFORMANCE AND USER CONVENIENCE OF BIOMETRIC SYSTEMS THAT USE IMAGES OF THE HUMAN EYE

(71) Applicant: Keith Hanna, New York, NY (US)

(72) Inventor: Keith Hanna, New York, NY (US)

(*) Notice: Subject to any disclaimer, the term of this patent is extended or adjusted under 35 U.S.C. 154(b) by 72 days.

(21) Appl. No.: 15/893,218

(22) Filed: Feb. 9, 2018

Related U.S. Application Data

(60) Provisional application No. 62/432,962, filed on Dec. 12, 2016.

(51) Int. Cl.
*G06K 9/62* (2006.01)
*G06K 9/00* (2006.01)

(52) U.S. Cl.
CPC ..... *G06K 9/00617* (2013.01); *G06K 9/00604* (2013.01); *G06K 9/6257* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,436,987 B2* | 10/2008 | Takano | ............... | A61B 3/0025 348/78 |
| 8,345,933 B2* | 1/2013 | Cottard | ............... | G06K 9/00597 382/115 |
| 8,472,681 B2* | 6/2013 | Hamza | ............... | G06K 9/00617 382/117 |
| 8,823,934 B2* | 9/2014 | Chhibber | ............. | A61B 5/0059 356/366 |
| 9,600,069 B2* | 3/2017 | Publicover | ............. | G06F 21/32 |
| 10,074,024 B2* | 9/2018 | el Kaliouby | ........... | G16H 50/20 |
| 2006/0055705 A1* | 3/2006 | Giron | .................... | G06T 19/006 345/582 |
| 2006/0093208 A1* | 5/2006 | Li | ........................ | G06K 9/6276 382/159 |
| 2007/0036397 A1* | 2/2007 | Hamza | ............... | G06K 9/00597 382/117 |
| 2010/0033333 A1* | 2/2010 | Victor | .................. | A61B 5/1114 340/576 |
| 2010/0309300 A1* | 12/2010 | Chhibber | ............. | G06T 7/0012 348/77 |

(Continued)

*Primary Examiner* — Tsung Yin Tsai
(74) *Attorney, Agent, or Firm* — Foley & Lardner LLP

(57) ABSTRACT

This disclosure describes methods and systems for improving performance of biometric systems that use features in the eye, such as iris or eye-veins, particularly when both biometric performance and user convenience are objectives. The disclosure relates to optimizing biometric performance when the iris or eye veins are neither fully visible, nor fully occluded, but in a partially-occluded state which occurs often when a user's eye is in a relaxed or natural state. In some embodiments, the method comprises a biometric enrollment or training step whereby an original image of a human eye is acquired, and a plurality of synthetic or augmented images are generated that are a combination of the original image and synthesized images that simulate specific ways that the eye can be occluded. A classifier can be trained using the plurality of augmented reference images, and subsequent recognition is performed using the classifier on newly acquired real images.

18 Claims, 10 Drawing Sheets

(56) References Cited

U.S. PATENT DOCUMENTS

| | | | | |
|---|---|---|---|---|
| 2014/0161325 A1* | 6/2014 | Bergen | ............... | G06K 9/00885 |
| | | | | 382/117 |
| 2015/0055821 A1* | 2/2015 | Fotland | ................... | G06T 7/246 |
| | | | | 382/103 |
| 2015/0134773 A1* | 5/2015 | Salem | ................ | G06F 19/3418 |
| | | | | 709/217 |
| 2015/0278167 A1* | 10/2015 | Arnold | ................ | G06K 9/6828 |
| | | | | 382/155 |
| 2015/0326570 A1* | 11/2015 | Publicover | ............. | H04N 5/247 |
| | | | | 726/4 |
| 2016/0035078 A1* | 2/2016 | Lin | ......................... | G06K 9/66 |
| | | | | 382/157 |
| 2016/0275341 A1* | 9/2016 | Li | ........................ | G06K 9/4642 |
| 2017/0024907 A1* | 1/2017 | Bermano | ................ | G06T 17/20 |
| 2017/0135577 A1* | 5/2017 | Komogortsev | .......... | A61B 3/14 |
| 2017/0330029 A1* | 11/2017 | Turcot | ................. | A61B 5/1176 |
| 2018/0125357 A1* | 5/2018 | Suzuki | ................. | A61B 3/113 |

\* cited by examiner

METHOD AND APPARATUS FOR IMPROVING THE MATCH PERFORMANCE AND USER CONVENIENCE OF BIOMETRIC SYSTEMS THAT USE IMAGES OF THE HUMAN EYE

CROSS-REFERENCE TO RELATED APPLICATIONS

This application claims priority to U.S. Provisional Application No. 62/432,962, filed Dec. 12, 2016, the content of which is hereby incorporated by reference in its entirety.

FIELD OF THE DISCLOSURE

The present application generally relates to improving the match performance of biometric systems that use images of the human eye, including but not limited to systems and methods for improving the means of providing reference imagery such that the performance of subsequent biometric recognition is greatly improved.

BACKGROUND

Biometric recognition using images of the human eye is becoming widespread. Example biometrics include: iris recognition, that uses the patterns in the iris for recognition, and eye-vein recognition that uses blood vessels in the scleral region of the eye. Most biometric systems that use the human eye work well when the iris or eye-veins are unoccluded in the image, and clearly will not work when the iris or eye-veins are completely occluded.

BRIEF SUMMARY

This summary is provided solely to introduce a more detailed description of embodiments as shown in the drawings and explained below.

Apparatus and methods are presented for improving the match performance and user convenience of biometric systems that use images of the human eye. This disclosure relates, for example, to optimizing biometric performance when the iris or eye veins are neither fully visible nor fully occluded, but partially occluded. Biometric match performance is achieved by performing a biometric enrollment step followed by a biometric matching step wherein the results of the biometric enrollment are compared to the results of the biometric matching step. The biometric enrollment step may be performed on a first camera and processor connected to a first database or memory, while the biometric matching step may be performed on the same or a second camera and processor connected the same or a second database or memory.

According to one aspect of the disclosure, the method for biometric enrollment comprises acquiring, by a camera module connected to a processor, a first image of an eye, generating a plurality of augmented images based on the first image of the eye, and training a classifier on at least one characteristic of the first image of the eye based on at least the set of augmented images to recover a first set of classifier parameters.

According to another aspect of the disclosure, the trained characteristic of the eye comprises the identity of the individual.

According to another aspect of the disclosure, the trained characteristic of the eye comprises a parametric model of the upper or lower eyelid of an eye.

According to another aspect of the disclosure, the parametric model of the upper or lower eyelid defines at least one of: a left position, a right position or a curvature of the eyelid.

According to another aspect of the disclosure, the parametric model of the upper or lower eyelid defines at least one of: a length of the eyelashes, a thickness of the eyelashes, and a density of the eyelashes.

According to another aspect of the disclosure, the augmented images are generated by defining a parametric model of an upper or lower eyelid, defining a plurality of parameter sets for the parametric model, for each parameter set, generating an augmented image by generating synthetic imagery of the upper or lower eyelid using the parameter set, and superimposing the synthetic imagery on the first image of the eye.

According to another aspect of the disclosure, the parametric model of the upper or lower eyelid defines at least one of: a left position, a right position or a curvature of the eyelid.

According to another aspect of the disclosure, the parametric model of the upper or lower eyelid defines at least one of: a length of the eyelashes, a thickness of the eyelashes, or a density of the eyelashes.

According to another aspect of the disclosure, the method for biometric matching comprises acquiring, by a camera module connected to a processor, a first image of an eye, generating a plurality of augmented images based on the first image of the eye, training a classifier on at least one characteristic of the first image of the eye based on at least the set of augmented images to recover a first set of classifier parameters, acquiring, by a camera module connected to a processor, a second image of an eye, processing the second image by a classifier configured with the first set of classifier parameters, and determining a biometric match score between the first image and second image based on the results of the processing;

In some embodiments, the method comprises a biometric training step whereby an original image of a human eye is acquired, and a plurality of synthetic or augmented images are generated that are a combination of the original image and synthesized images. These images simulate specific ways that the eye can be occluded that have been found to be relevant to biometric recognition using the human eye. Each of these synthetic images has an index that indicates that the image is derived from the original image and a particular person P. These images are fed into a classifier to produce a set of classifier parameters that are stored in a database or memory. The classifier and the classifier parameters can then be used in a recognition step whereby a real first image with partially-occluded iris or eye-vein features may be fed into a classifier using all or a subset of the classifier parameters, the classifier identifies that the real first image matches one or more of the synthetic or augmented images, and the corresponding index for the matched images may be used to indicate that real image corresponds to the particular person P.

In some embodiments, the training step for biometric recognition using images of the eye is performed by acquiring, by a camera module connected to a processor, first imagery of an eye, generating a plurality of images each with an index that identifies that the plurality of images are from the same eye of the same individual, and such that each of the plurality of images comprises the first image modified by at least one of an eyelid or eyelash model, and by training a classifier using the plurality of images to generate a set of training parameters for subsequent biometric recognition.

In some embodiments the eyelid model comprises at least an upper eyelid model with parameters that define at least one of a left position, a right position and a curvature of the eyelid.

In some embodiments the eyelid model comprises at least an upper eyelash model with parameters that define at least one of a length of the eyelashes in the direction of the iris of the eye, a thickness of the eyelashes, and a density of the eyelashes.

In some embodiments the eyelid model comprises at least a lower eyelid model with parameters that define at least one of a left position, a right position and a curvature of the eyelid.

In some embodiments, the eyelid model comprises at least a lower eyelash model with parameters that define at least one of: a length of the eyelashes in the direction of the iris of the eye, a thickness of the eyelashes, and a density of the eyelashes In some embodiments the step of subsequent biometric recognition may comprise acquiring, by a camera module connected to a processor, at least one second image of an eye, determining a first matched image for the second image by retrieving, from a database or memory into the processor, at least a subset of the training parameters into a classifier and by performing classification, and, determining the identity of an individual from the index of the first matched image.

In some embodiments, a system for biometric recognition of the eye may comprise a camera module, a processor, and a database configured to acquire, by the camera module connected to a processor, first imagery of an eye, generate, by the processor, a plurality of images each with an index that identifies that the plurality of images are from the same eye of the same individual, and such that each of the plurality of images comprises the first image modified by at least one of an eyelid or eyelash model, and store, in a database or memory connected to the processor, the set of training parameters for subsequent biometric recognition.

BRIEF SUMMARY OF FIGURES

The foregoing and other objects, aspects, features, and advantages of the present solution will become more apparent and better understood by referring to the following description taken in conjunction with the accompanying drawings, in which.

DETAILED DESCRIPTION

Figure 1:
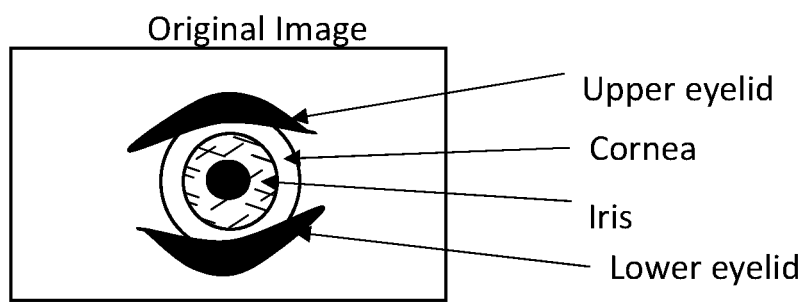
FIG. 1 shows, in one embodiment, an original image of an eye, acquired by a camera module configured to acquire the iris texture
Figure 2:
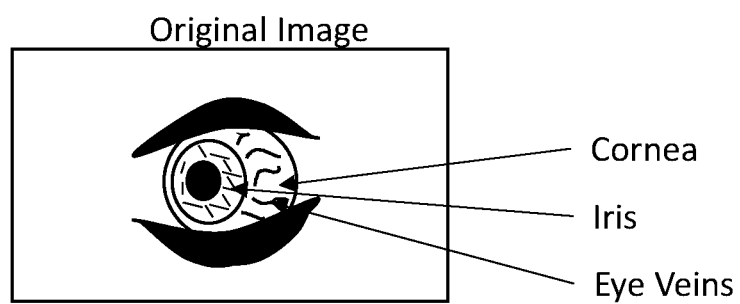
FIG. 2 shows, in one embodiment, the original image of an eye, acquired by a camera module configured to acquire the eye veins

Biometric recognition using images of the human eye is becoming more widespread. Example biometric include: iris recognition, that uses the patterns in the iris for recognition (see FIG. 1), and eye-vein recognition that uses blood vessels in the scleral region of the eye for recognition (see FIG. 2). Most biometric systems that use the human eye work well when the iris or eye-veins are unoccluded in the image, and clearly will not work when the iris or eye-veins are completely occluded. This disclosure relates to optimizing biometric performance when the iris or eye veins are neither fully visible or fully occluded, but partially occluded. This is particularly relevant in biometric systems where both biometric performance and user convenience are objectives.

Biometric systems that use images of the human eye, such as those proposed by Daugman (U.S. Pat. No. 5,291,560) or Iritech (U.S. Pat. No. 6,247,843) perform a segmentation step that fits a model to the eye to separate the iris texture from the rest of the eye. Such models typically include parameters that aim to define the boundary of the pupil/iris boundary, the iris/sclera boundary, and the upper and lower eyelid boundaries. There are at least two problems with these approaches however. First, the models are imprecise, and important biometric information can be eliminated in the model-fitting process. For example, the eyelid boundary model may be a simple contour that rejects biometric information that may be visible between eyelashes. Second, as the human eye becomes more occluded due to eyelid closure (upper or lower) that may happen due to the presence of bright sunlight or other reasons, then there is less information for the model fitting processes to use, which result in progressively more unreliable and imprecise recovery of the model parameters, and therefore more unreliable biometric recognition. A user interface may request the user to open up their eyes widely in order to mitigate these problems, but this may be inconvenient for the user.

In one embodiment of the present solution, one means of recognition that typically does not need the explicit prior recovery of model parameters is Deep Learning, for example, Krizhevsky, Sutskever, Hinton, "ImageNet classification with deep convolutional neural networks", Proceedings of Advances in Neural Information Processing Systems, 2012. In this particular embodiment, a classifier is trained on one or more example images to derive a set of classifier parameters that are then used in the recognition step. However it is impractical, unreliable and time consuming to configure a set of acquisition conditions (e.g. bright and dark ambient conditions) and user instructions (e.g. open eyes wide, squint, partially close eyes) to acquire a wide set of real training images for an individual. The present solution relates in some embodiments to identifying and modeling particular characteristics of eye features that occlude biometric features of the human eye, and by automatically synthesizing imagery that simulate these occluding features, and that are used to generate a plurality of images with different degrees of simulated partial occlusion that are then used to train the classifier.

There are two primary occluding features that obscure biometric features in the eye; the eyelids and the eyelashes.

Eyelid Modeling

The degree that the eyelids in particular obscures the eye is a function of several combined factors. In a first factor, if a user looks up towards a biometric acquisition device then typically both the head tilts upwards and the upper eyelid is retracted upwards also. Conversely, if a user looks down towards a biometric acquisition device then typically both the head tilts downward and the upper eyelid becomes more closed. In a second factor, a user may either voluntarily or involuntarily partially close their eyes in response to strong ambient illumination, such as the sun. In a third factor, the biometric features of the eye of a user may naturally be partially occluded even when their eye is in a relaxed state, unless they are asked to open up their eyes unnaturally during an image acquisition step. All three factors may occur together during an image acquisition process.

Figure 3:
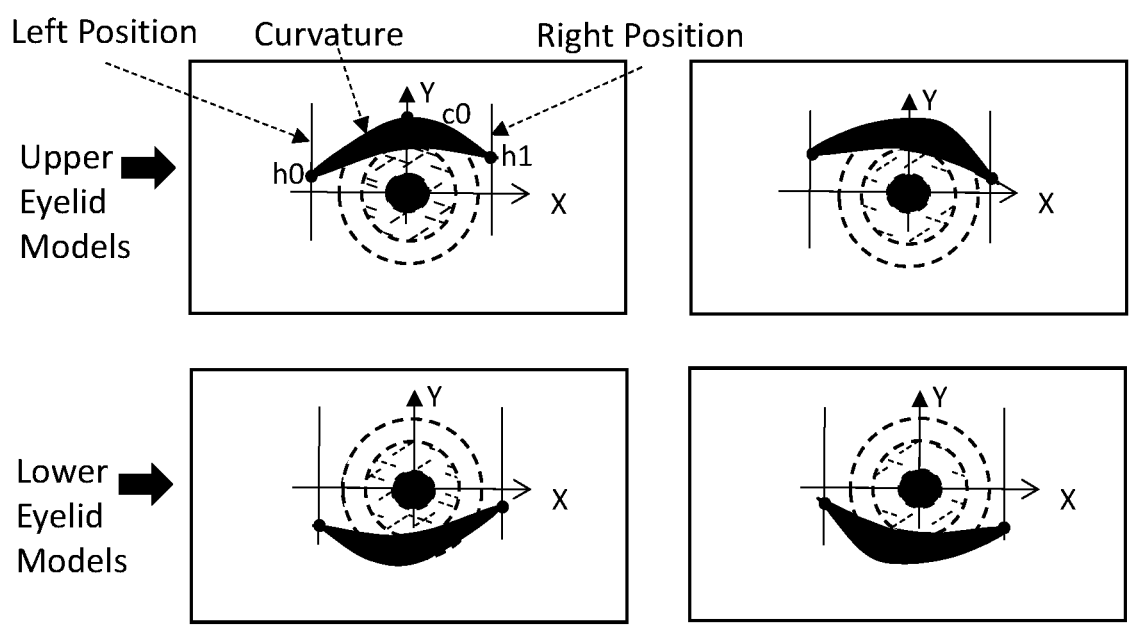
FIG. 3 shows, on the top row, in one embodiment, two upper eyelid models with different parameters that adjust the curvature of the eyelid, and the left position and the right position of the eyelid with respect to an eye center. The bottom row shows the same for a lower eyelid model.

In one embodiment of the present solution, the upper eyelid is modeled as a concave contour with a particular curvature (concave with respect to the center of the eye) with particular intersecting left positions and right positions on vertical axes positioned on either side of the eye, as shown at the top left of FIG. 3. The approximate position of the eye is first identified using one of many methods known in the art. An example is Camus and Wildes (U.S. Pat. No. 7,599,524). The eye detector is only used to determine the approximate position of the pupil in the acquired image. The scale and orientation of the image is typically known a priori from the optical characteristics of the image acquisition system. In one particular embodiment, a coordinate system is constructed using the located center of the eye, as shown at the top left of FIG. 3. A vertical axis is positioned to the left of the eye center. In some embodiments, the vertical axis may be positioned at a distance from the recovered center of the pupil of at least 55% of the expected diameter of the iris. In some other embodiments, this may be 75%. A point h0 is then defined on this axis as shown. Similarly, a right vertical axis is defined to the right of the recovered eye center, and a point h1 is defined. h0 and h1 define the intersecting points of the upper eyelid model contour, while a separate parameter models the curvature of the upper eyelid model contour model. In some embodiments, the upper eyelid model may be a parabola such that:

$$Ax^2+Bxy+Cy^2+Dx+Ey+F=0$$

Where A,B,C,D,E,F are parameters of the parabola. c0 defines the difference of the point on the eyelid contour and (h0+h1)/2, which is the vertical coordinate of the mid-point of the straight line that intersects h0 and h1. If c0 is 0, then there is no curvature to the eyelid model. If c0 is positive, then there is a curvature that produces a concave upper eyelid model with respect to the center of the eye. For a given three points: h0, h1 and c0, 3 (x,y) coordinates are defined. Each of these 3 coordinates provides 2 equations which can be fit using standard least-squares methods to the parabolic equation above. The parabolic equation has 6 unknowns (A,B,C,D,E,F) and there are 6 equations that can be solved simultaneously using known least-squares methods, for example, as described in https://en.wikipedia.org/wiki/Least squares. In some embodiments of the present solution, the ranges of the 3 parameters h0,h1,c0 are chosen to include particular configurations of the upper eyelid. If the expected diameter of the iris from the known optical configuration of the image acquisition device is d0 pixels, then in one embodiment the preferred ranges of the 3 parameters are:

$$-d0/4<=h0<=d0/2$$

$$-d0/4<=h1<=d0/2$$

$$0<c0<=d0/2$$

The constraint on h0 and h1 allows the model of the upper eyelid to span from below the eye center (due to the negative value −d0/4) whereby the upper eye is almost entirely occluded, to the same height as the iris (due to the value d0/2; half the iris diameter). The constraint that c0 is always positive ensures that the upper eyelid is always concave with respect to the eye center, and the constraint that c0<=d0/2 ensures that the curvature of the upper eyelid does not exceed a particular value.

In some embodiments, each parameter is sampled within each range with equal spacing. For example, in one embodiment, five (5) equal values of h0 may be sampled within the range −d0/4 to d0/2. Similarly, 5 values of h1 and of c0 may be sampled. This results in 5×5×5=125 combinations of h0,h1,c0. Each of these combinations is then used to recover the parameters A,B,C,D,E,F in the equation above to recover a set of parabolas that model the upper eyelid of the eye.

The lower eyelid can be modeled in the same way as the upper eyelid. The preferred ranges of the parameters h0, h1, and c0 in some embodiments are typically slightly different however. In particular, preferred ranges of the parameters are:

$$-d0/2<=h0<=0$$

$$-d0/2<=h1<=0$$

$$-d0/2<=c0<0$$

The constraint on h0 and h1 allows the model of the lower eyelid to span from the eye center (due to the constraint <=0) whereby the lower eye is almost entirely occluded, to the same dimension as the iris radius (due to the value −d0/2; half the iris diameter). The constraint that c0 is always negative ensures that the lower eyelid is always concave with respect to the eye center, and the constraint that −d0/2<=c0 ensures that the curvature of the lower eyelid does not exceed a particular value.

Eyelash Modeling

Figure 4:
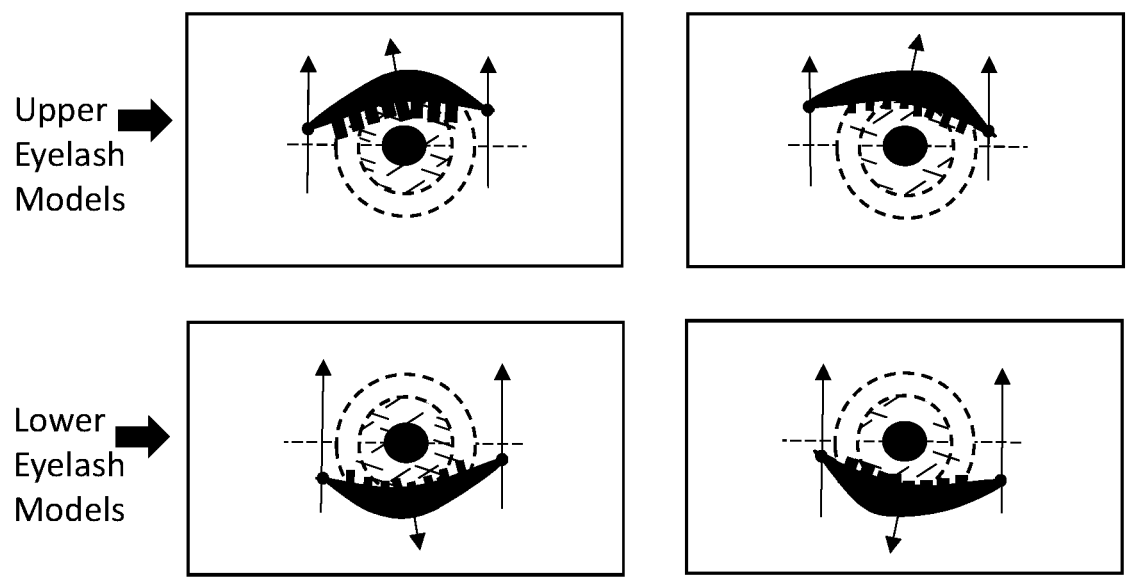
FIG. 4 shows, on the bottom row, in one embodiment, two lower eyelash models with different parameters that adjust the length of the eyelashes in the direction of the iris of the eye, a thickness of the eyelashes, and a density of the eyelashes. The bottom row shows the same for a lower eyelash model.

Eyelashes are another important aspect of the occlusion model. Eyelashes can also occlude the biometric features of the eye, and the way that eyelashes occlude are different from individual to individual. In some individuals, eyelashes on the upper eyelid curve upwards from the boundary of the upper eyelid, largely having no additional impact to occlusion compared to the occlusion of biometric features that already occurs due to the upper eyelid. In some individuals however, the eyelashes of the upper eyelid curve forwards and down over the boundary of the upper eyelid. In one embodiment, key attributes of the eyelashes include a length of the eyelashes in the direction of the iris of the eye, a thickness of the eyelashes, and a density of the eyelashes. Examples of these different attributes are shown in FIG. 4. In some embodiments, the density of the eyelashes corresponds to the number of eyelashes per horizontal unit of measurement across the image of the eye. In some embodiments, the thickness of the eyelashes corresponds to the width of the eyelash in pixels. In some embodiments, the length of the eyelashes corresponds to the length in pixels that the eyelash protrudes from the eyelid contour.

In some embodiments, for a given parabolic contour of the upper eyelid given by the parameters A,B,C,D,E,F, points along the contour are defined with an equal horizontal spacing in the x direction corresponding to the eyelash density. In one embodiment, if the iris diameter is d0, then an example density RHO may be d0/30, such that approximately 30 eyelashes span the upper eyelid contour. In the same embodiment, an example eyelash length L may vary from 0 to d0/5, such that the eyelashes extend for 20% ($\frac{1}{5}^{th}$) of the iris diameter. In the same embodiment, an example thickness of the eyelashes T may be d0/100. In a specific example of an embodiment, the x coordinate of the upper eyelid contour may be traversed from one side to the other side in increments of the density RHO, and the y value of the contour computed from the parabolic parameters A,B,C,D, E,F. The gradient of the parabolic contour can be computed using standard calculus, and the direction orthogonal to this can be computed by taking the negative inverse of this value. This defines a line that protrudes perpendicular to the local orientation of the eyelid contour. The parameter L may be used to define the length of the line that protrudes from the eyelid, and the parameter T may be used to define the thickness of the line.

Similar to the eyelid model, various ranges of RHO, T and L can be traversed. In one embodiment, these ranges may be:

$$d0/50<=RHO<=d0/20$$

$$0<=L<=d0/5$$

$$d0/200<=T<=d0/50$$

In some embodiments, each range may be sampled in 5 equally spaced steps, resulting in 125 possible combinations of upper eyelash models.

The lower eyelash may be modeled in a similar way, resulting in another 125 possible combinations of lower eyelid models.

Generating Imagery

The described models can then be used to generate mask images that can be superimposed or combined with one or more original images of the eye of an individual. In an example of one embodiment, there may be 125 combinations of each of the upper eyelid, lower eyelid, upper eyelash and lower eyelash models, resulting in 125^4=244,140,625 different combinations of parameters, each of which can be used to generate a mask image. In some embodiments, the number of combinations may be reduced by taking into account additional constraints. For example, in some embodiments a constraint may be that the density of the eyelashes in the upper and lower eyelids are the same. In some embodiments, a constraint may be that the thickness of the eyelashes in the upper and lower eyelids are the same. In this embodiment these constraints can be used to reduce the number of possible combinations to: 125×125 eyelid combinations, 125 for the upper eyelash combinations, and 5 for the lower eyelash length, resulting in 9,765,625 combinations.

Figure 5:
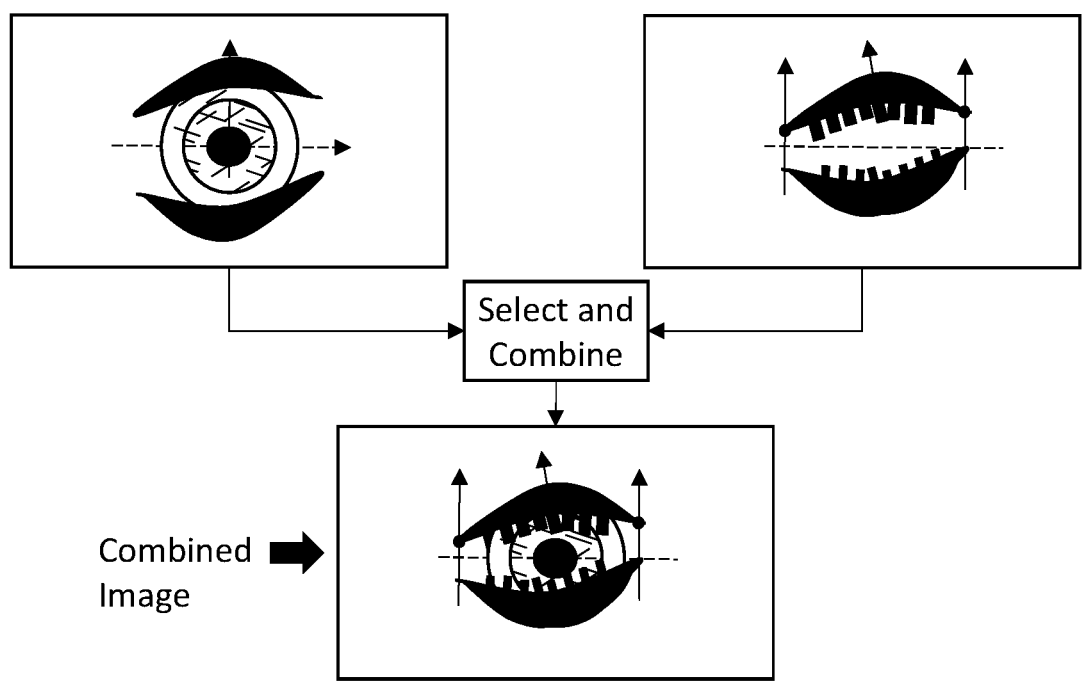
FIG. 5 shows one embodiment of a combined image comprising the original image, an upper eyelid model, an upper eyelash model, a lower eyelid model, and a lower eyelash model

A mask image for each of the combination of parameters may be generated by marking a pixel in an image as occluding biometric features if either an eyelash is present at the pixel as defined by the model, or if the pixel is on the convex side of an eyelid contour, which corresponds to the side of the eyelid contour with no biometric information. Next, the mask image and the original eye image are combined in a combination step. In some embodiments the combination step comprises a selection process whereby at each pixel in the mask image, if a pixel is marked as described, then a fixed pixel brightness of 128 is placed in the combined image, otherwise the pixel from the original image is placed in the combined image. The result is the original eye image with the eyelid and eyelash models overlaid. This is shown in FIG. 5. This process is repeated for all combinations of parameters, resulting in a plurality of combined images, each with an original image with various degrees of eyelid and eyelash occlusion superimposed on top of them.

Figure 6:
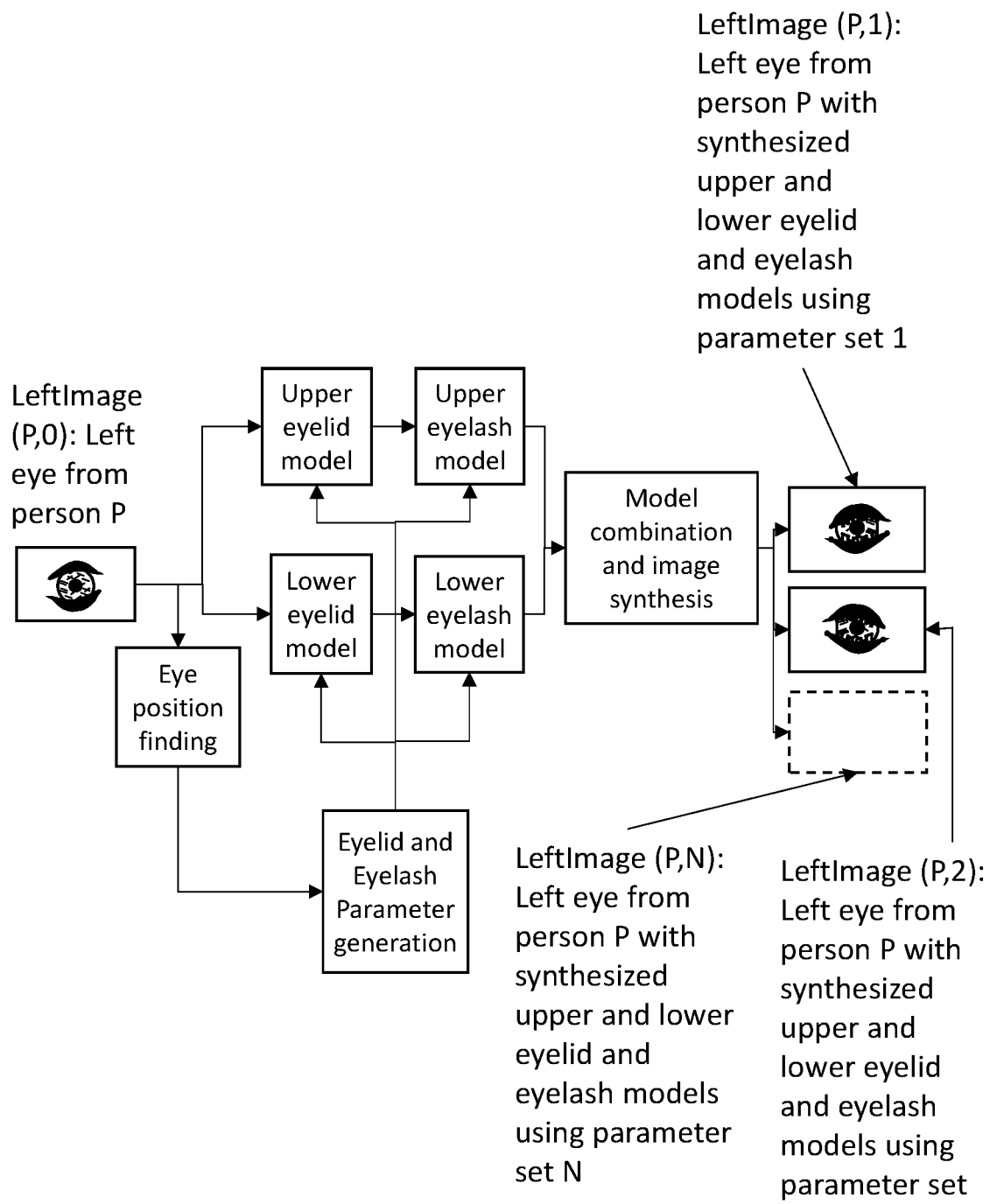
FIG. 6 shows a block diagram of one embodiment of a method for generating, from a left image of an eye from a person P (LeftImage(P,0)), a plurality of combined images comprising the original image, an upper eyelid model, an upper eyelash model, a lower eyelid model, and a lower eyelash model with different parameter sets 1, 2 . . . to N of the models (LeftImage(P,1), LeftImage(P,2), . . . LeftImage (P,N))

FIG. 6 shows a complete block diagram of the steps to generate the plurality of synthesized (or augmented) images from a single input image.

Training the Classifier

Figure 7:
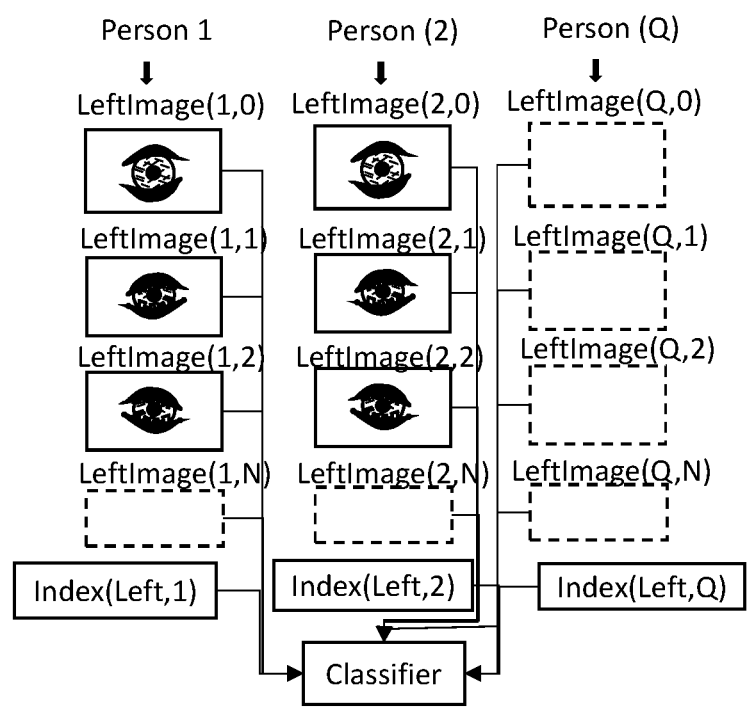
FIG. 7 shows a block diagram showing an embodiment of the generated combined images being fed into a classifier, with the left column showing the original left image of person 1 image and the generated combined images from the left image of person 1 all having the corresponding identifying index: Index(Left,1). The middle column shows the same for person 2, and the right column shows the same for person Q.

In some embodiments, the images are fed into a classifier. The embodiment may use several different classifier methods, for example Krizhevsky, Sutskever, Hinton, "ImageNet classification with deep convolutional neural networks", Proceedings of Advances in Neural Information Processing Systems, 2012. FIG. 7 shows a block diagram showing the generated combined images being fed into a classifier, with the left column showing the original left image of person 1 image and the generated combined images from the left image of person 1 all having the corresponding identifying index: Index(Left,1). The middle column shows the same for person 2, and the right column shows the same for person Q. The classifier is being given many examples of the same eye, but with different occlusion characteristics. The fact that they are of the same eye is recorded in the identifying index: Index(Left, 1) in the illustrative example. These occlusion characteristics as well as the iris texture for that particular eye are learned by the classifier, resulting in a set of classifier parameters.

Recognition Using the Classifier

Figure 8:
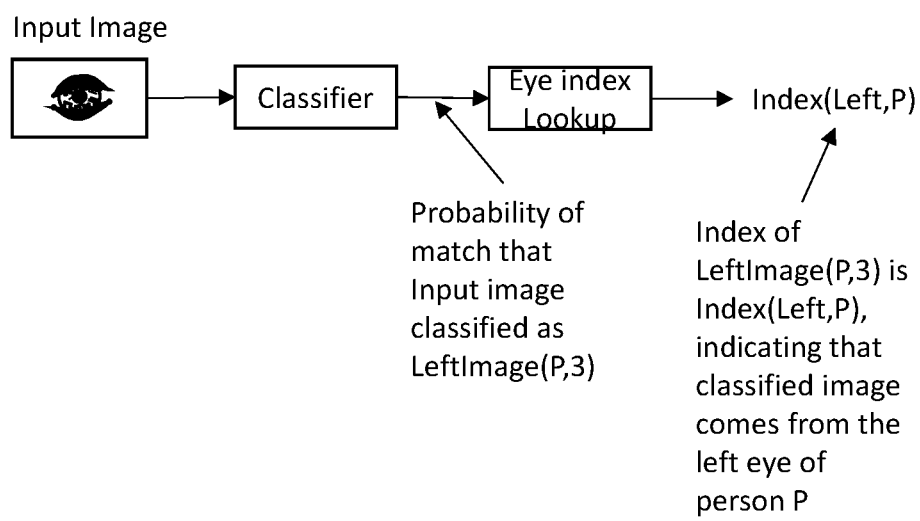
FIG. 8 shows an example of a newly acquired image being fed into the pre-trained classifier, classifying the input image as being the pre-trained image LeftImage(P,3), performing an eye index lookup process to return the index: Index(Left,P), indicating a probability of match, or that the input image comes from the left eye of person P.

FIG. 8 shows a newly acquired image being fed into the pre-trained classifier. In some embodiments this returns a probability of match with respect to each of the pre-trained images, and in some embodiments the pre-trained image with the highest probability of match may be selected as a candidate match for the newly acquired image. A lookup step retrieves from a database the index associated with the image, indicating in this illustrative example that the image was derived from the left eye of person P.

System Implementations

In some embodiments, the method comprises a biometric training step whereby an original image of a human eye is acquired, and a plurality of synthetic images are generated that are a combination of the original image and synthesized images that simulate specific ways that the eye can be occluded that have been found to be relevant to biometric recognition using the human eye. Each of these synthetic images has an index that indicates that the image is derived from the original image and a particular person P. These images are fed into a classifier to produce a set of classifier parameters that are stored in a database or memory. The classifier and the classifier parameters can then be used in a recognition step whereby a real first image with partially-occluded iris or eye-vein features can be fed into a classifier using all or a subset of the classifier parameters, the classifier identifies that the real first image matches one or more of the synthetic images, and the corresponding index for the matched images can be used to indicate that real image corresponds to the particular person P.

Figure 9:
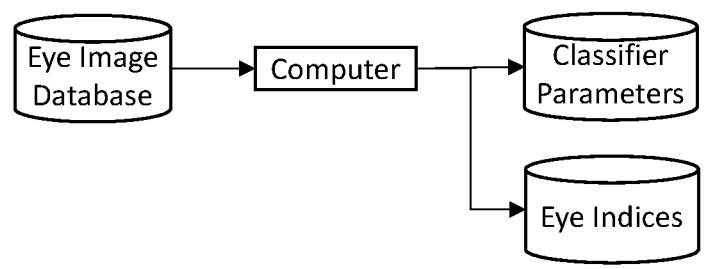
FIG. 9 shows an example implementation of one embodiment of the training system, showing a database of eye images connected to a computer, and outputting the trained classification parameters to a database, and outputting the eye indices to a database
Figure 10:
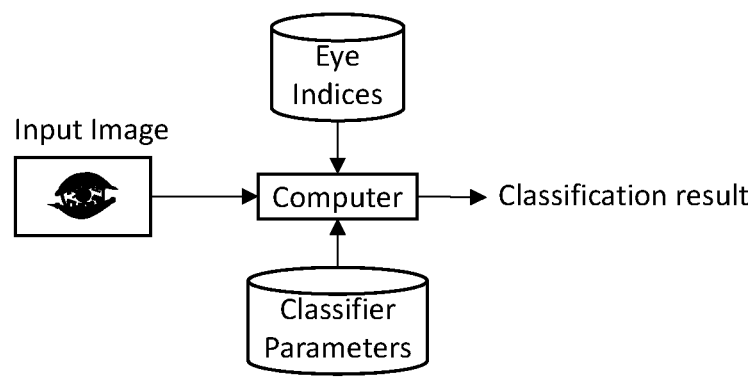
FIG. 10 shows an example implementation of one embodiment of a recognition system that uses the pre-trained classifier, whereby an input image of an eye is input into a computer, the pre-trained classifier parameters are fed into the computer from the database, and whereby the eye indices are fed into the computer.

FIG. 9 shows an implementation of one embodiment of the training system, showing a database of eye images connected to a computer, and outputting the trained classification parameters to a database, and outputting the eye indices to a database. FIG. 10 shows an implementation of one embodiment of a recognition system that uses the pre-trained classifier, whereby an input image of an eye is input into a computer, the pre-trained classifier parameters are fed into the computer from the database, and whereby the eye indices are fed into the computer.

What is claimed is:

1. A method for biometric enrollment, comprising:
   acquiring, by a camera module connected to a processor, a first image of an eye;
   generating a plurality of augmented images based on the first image of the eye;
   training a classifier on at least one characteristic of the first image of the eye based on at least the plurality of augmented images to recover a first set of classifier parameters; and
   determining, using the classifier and the first set of classifier parameters, a biometric match score between a second image and one of the plurality of augmented images to determine whether the second image is acquired from the eye.

2. The method of claim 1, wherein the trained at least one characteristic of the first image of the eye comprises an identity of the individual with the eye.

3. The method of claim 1, wherein the trained at least one characteristic of the first image of the eye comprises a parametric model of an upper or lower eyelid of the eye.

4. The method of claim 3, wherein the parametric model of the upper or lower eyelid defines at least one of: a left position, a right position or a curvature of the upper or lower eyelid.

5. The method of claim 3, wherein the parametric model of the upper or lower eyelid defines at least one of: a length of eyelashes of the upper or lower eyelid, a thickness of the eyelashes, or a density of the eyelashes.

6. The method of claim 1, wherein generating the plurality of augmented images comprises:
   defining a parametric model of an upper or lower eyelid;
   defining a plurality of parameter sets for the parametric model; and
   for each parameter set of the plurality of parameter sets, generating an augmented image by generating synthetic imagery of the upper or lower eyelid using the parameter set, and superimposing the synthetic imagery on the first image of the eye.

7. The method of claim 6, wherein the parametric model of the upper or lower eyelid defines at least one of: a left position, a right position or a curvature of the upper or lower eyelid.

8. The method of claim 6, wherein the parametric model of the upper or lower eyelid defines at least one of: a length of eyelashes of the upper or lower eyelid, a thickness of the eyelashes, or a density of the eyelashes.

9. A method for biometric matching, comprising:
   acquiring, by a camera connected to a processor, a first image of an eye;
   generating a plurality of augmented images based on the first image of the eye;
   training a classifier on at least one characteristic of the first image of the eye based on at least the set of augmented images to recover a first set of classifier parameters;
   acquiring, by a camera connected to a processor, a second image of an eye;
   processing the second image using the classifier and the first set of classifier parameters; and
   determining a biometric match score between the first image and second image based on a result of the processing using the classifier and the first set of classifier parameters.

10. A system for biometric enrollment of the eye, the system comprising:
    a camera configured to acquire a first image of an eye;
    a hardware processor configured to:
       generate a plurality of augmented images based on the first image of the eye, and storing the plurality of augmented images in a database or memory connected to the hardware processor; and
       train a classifier on at least one characteristic of the first image of the eye based on at least the plurality of augmented images to recover a first set of classifier parameters, wherein the classifier and the first set of classifier parameters is used to determine a biometric match score between a second image and one of the plurality of augmented images to determine whether the second image is acquired from the eye; and
    memory configured to store the plurality of augmented images and the first set of classifier parameters.

11. The system of claim 10, wherein the trained at least one characteristic of the first image of the eye comprises an identity of an individual with the eye.

12. The system of claim 10, wherein the trained at least one characteristic of the first image of the eye comprises a parametric model of an upper or lower eyelid of the eye.

13. The system of claim 12, wherein the parametric model of the upper or lower eyelid defines at least one of: a left position, a right position or a curvature of the upper or lower eyelid.

14. The system of claim 12, wherein the parametric model of the upper or lower eyelid defines at least one of: a length of eyelashes of the upper or lower eyelid, a thickness of the eyelashes, or a density of the eyelashes.

15. The system of claim 10, wherein the hardware processor is configured to generate the plurality of augmented images by:
    defining a parametric model of an upper or lower eyelid;
    defining a plurality of parameter sets for the parametric model;
    for each parameter set of the plurality of parameter sets, generating an augmented image by generating synthetic imagery of the upper or lower eyelid using the parameter set, and superimposing the synthetic imagery on the first image of the eye; and storing the plurality of augmented images in the memory.

16. The system of claim 15, wherein the parametric model of the upper or lower eyelid defines at least one of: a left position, a right position or a curvature of the upper or lower eyelid.

17. The system of claim 15, wherein the parametric model of the upper or lower eyelid defines at least one of: a length of eyelashes of the upper or lower eyelid, a thickness of the eyelashes, or a density of the eyelashes.

18. A system for biometric enrollment and matching of the eye, the system comprising:

a first camera configured to acquire a first image of an eye;

at least one hardware processor configured to:

generate a plurality of augmented images, based on the first image of the eye, and storing the plurality of augmented images in the first database or memory connected to the at least one hardware processor;

train a classifier on at least one characteristic of the first image of the eye based on at least the plurality of augmented images to recover a first set of classifier parameters;

memory configured to store the first set of classifier parameters;

a second camera configured to acquire a second image of an eye;

wherein the at least one hardware processor is further configured to:

process the second image using the classifier and the first set of classifier parameters retrieved from the memory; and determine a biometric match score between the first image and second image based on results of the processing using the classifier and the first set of classifier parameters.

\* \* \* \* \*